Figure 1:
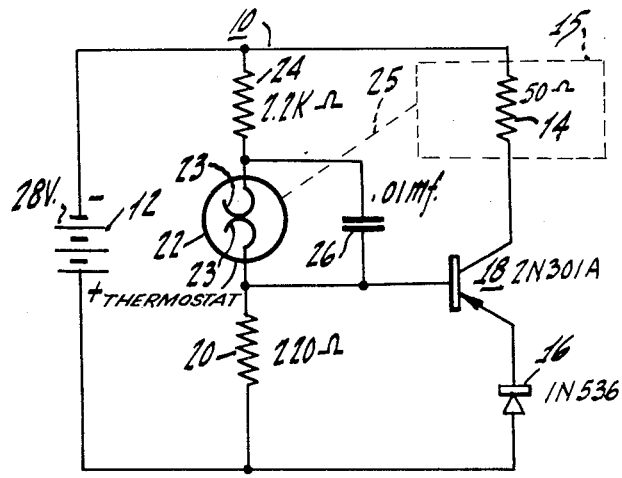

INVENTOR.
ROBERT R. BIGLER

United States Patent Office 3,068,338
Patented Dec. 11, 1962

3,068,338
THERMOSTATICALLY CONTROLLED CIRCUITS
Robert R. Bigler, Erlton, N.J., assignor to Radio Corporation of America, a corporation of Delaware
Filed Dec. 22, 1960, Ser. No. 77,562
8 Claims. (Cl. 219—20)

This invention relates generally to thermostatically controlled circuits, and more particularly to apparatus for controlling the amplitude of current to a load in accordance with the temperature sensed by a thermostat. The apparatus of the present invention is particularly useful for maintaining the temperature of an oven, such as one used for maintaining substantially constant temperature of a frequency control crystal.

In order to maintain the frequency of a crystal in an oscillator circuit substantially constant, it is important to maintain the temperature of the crystal substantially constant. This is accomplished by enclosing the crystal in an electrically controlled oven and maintaining the temperature of the oven substantially constant. In known ovens of this type, a make-and-break thermostat is connected in series with a source of current to a heating element, and the current to the heating element is controlled by the thermostat. In the prior art circuits for these ovens, however, the full load current passes through the thermostat, and the contact points on the thermostat tend to burn and to pit badly because of the resultant heavy sparking. This action tends to reduce the life and the reliability of precision thermostats.

Accordingly, it is an object of the present invention to provide improved thermostatically controlled circuits employing thermostats in an arrangement that obviates, or markedly minimizes, the aforementioned disadvantage of the prior art circuits.

Another object of the present invention is to provide improved apparatus for controlling a current of a relatively large amplitude to a load by means of a current of a relatively smaller amplitude in a control circuit including a thermostat.

Still another object of the present invention is to provide improved thermostatically controlled circuits that are relatively simple in construction, very reliable in operation, and highly efficient in use.

In accordance with the present invention, the improved apparatus for controlling the amplitude of current to a load in accordance with the temperature of a thermostat comprises a network having two parallelly connected circuits, namely, a load circuit and a control circuit therefor. The load circuit comprises a transistor whose emitter-collector path is connected in series with the load. The control circuit comprises the thermostat and an impedance connected in series therewith. A source of voltage is connected across hte parallelly connected load and control circuits, and the control circuit is connected to the base of the transistor in the load circuit to control current to the load in accordance with the temperature of the thermostat.

Figure 2:
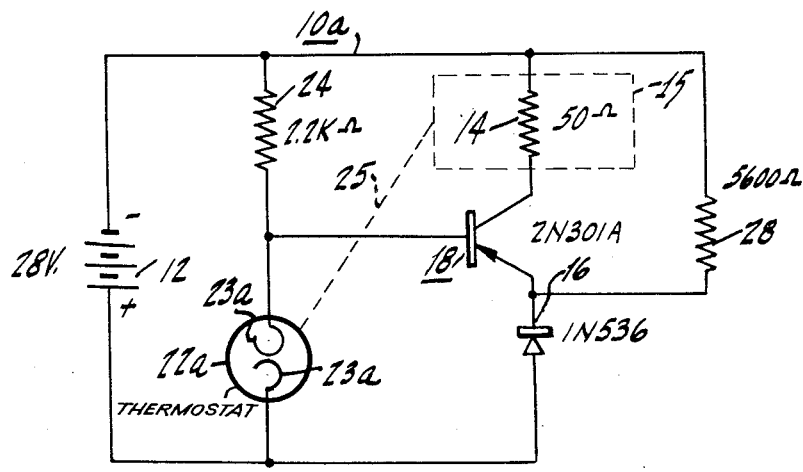

The novel features of the present invention, both as to its organization and method of operation, as well as additional objects and advantages thereof, will be more readily understood from the following description, when read in connection with the accompanying drawing, in which similar reference numerals designate similar parts throughout, and in which:

FIG. 1 is a schematic diagram of one embodiment of the invention in which a thermostatically controlled circuit employs a normally closed thermostat; and FIG. 2 is a schematic diagram of another embodiment of the invention employing a thermostatically controlled circuit having a normally open thermostat.

Referring, now, to FIG. 1 of the drawing, there is shown a thermostatically controlled circuit 10 for controlling current from a voltage source 12 to a load 14, represented as a resistor. The load 14 may be a heating element of the type used in the heating circuit of an oven 15, shown as a dashed rectangle herein. The voltage source 12 is connected across a load circuit comprising a forwardly biased diode 16, the emitter-collector path of a P-N-P transistor 18, and the load 14, serially connected to each other in the order named. The diode 16 is preferably of the silicon type. A control circuit is connected in parallel with the load circuit and comprises a resistor 20, a make-and-break thermostat 22, and a resistor 24, connected in series with each other in the order named. The common junction of the thermostat 22 and one terminal of the resistor 20 is connected to the base of the transistor 18. The anode of the diode 16 is connected to the other terminal of resistor 20 and to the positive pole of the source 12.

The thermostat 22 is physically located in the environment of the heat produced by the load 14, as indicated by the dashed line 25. The thermostat 22 comprises normally closed, bimetallic contacts 23 at relatively low temperatures. These contacts 23 are adapted to open when a preset, critical temperature is reached, whereby to stop the flow of current to the load 14. A capacitor 26 is connected across the contacts 23 of the thermostat to minimize sparking.

The operation of the thermostatically controlled circuit 10 will now be described. Let it be assumed that the load 14 is a heater element for the oven 15 whose temperature is to be controlled by the thermostat 22. The normally closed contacts 23 of the thermostat are adjusted to open at a critical temperature, which may be the temperature at which the oven is to be maintained substantially constant. When the oven is cold, current flows through the resistor 20, the closed contacts 23, and the resistor 24 in the control circuit. The voltage across the resistor 20 provides a forward bias for the transistor 18 so that current flows from the emitter to the base of the transistor 18, reducing the transistor 18 resistance. Current now flows to the load 14 to heat the latter. When the critical temperature is reached, the contacts 23 of the thermostat open. This action causes the P-N-P transistor 18 to be reverse biased, and current to the load 14 is cut off. The small voltage drop across the forwardly biased diode 16, resulting from leakage current through the transistor 18, now causes the emitter of the transistor to be more negative than the base when the contacts 23 of the thermostat are open. This arrangement provides an effective cut-off of current to the load 14 when the contacts 23 are open. The diode 16 is preferred to a fixed resistor for developing a small back bias voltage because the diode presents a very low resistance to the flow of large amplitudes of current in the forward direction. When the temperature of the oven falls just below the critical temperature, the contacts 23 of the thermostat close and again provide the transistor 18 with a forward bias so that current flows again to the load 14. Since the base current of the transistor 18 is relatively small, and since the resistance of the control circuit is relatively much higher than the normal resistance of the load circuit, much less current flows in the control circuit than in the load circuit. This action results in relatively little current going through the thermostat 22 so that it is not heated substantially by the current through it. Thus, the thermostat 22 is affected mainly by the ambient temperature and not by the control current. Also, relatively little current through the thermostat 22 results in relatively little sparking across the contacts 23 of the thermostat when the contacts 23 open. This action prevents excessive sparking and burning of the contacts 23.

Referring, now, to FIG. 2 of the drawing, there is shown a thermostatically controlled circuit 10a that differs in certain respects from the circuit 10 of FIG. 1. Circuit 10a uses a thermostat 22a that has normally open contacts 23a at relatively low temperatures. In the circuit 10a, the control circuit comprises a thermostat 22a connected in series with the resistor 24. The common junction of the thermostat 22a and the resistor 24 is connected to the base of the transistor 18 in the load circuit 14. A relatively large resistor 28 is connected between the cathode of the diode 16 and the negative terminal of the voltage source 12 to insure reverse bias of an adequate magnitude when the transistor 18 is operated at relatively high temperatures.

The operation of the thermostatically controlled circuit 10a of FIG. 2 will now be described. Let it be assumed that the circuit 10a is in the oven 15 that is to be maintained at a critical temperature, namely, the temperature at which the contacts 23a of the thermostat 22a are adapted to close in a manner well known in the art. When the oven is cold, the contacts of the thermostat 22a are open, and the voltage at the base of the transistor 18 is negative with respect to the voltage at the emitter of the transistor 18. Consequently, current flows in the load circuit to the load 14 to heat the latter. When the temperature of the oven reaches the critical temperature to which the thermostat 22a is set, the contacts 23a close and connect the base of the transistor 18 to the positive terminal of the voltage source 12. Under these conditions, a very small drop in voltage across the forwardly biased diode 16 causes the voltage at the emitter of the transistor 18 to be more negative than the voltage at the base of the transistor. The transistor 18 is, therefore, reverse biased and current to the load 14 ceases. When the temperature of the oven falls below the critical temperature, the contacts 23a open, and current once more flows through the load 14. The aforementioned cycle of events will be repeated when the temperature of the oven reaches the critical temperature again.

From the foregoing description, it will be apparent that there have been provided improved, thermostatically controlled circuits adapted to control the temperature of an oven by means of current from a direct current source. The value of the components indicated on the figures of the drawing are merely illustrative of the embodiments shown and described, and they are not to be construed in a limiting sense. While only two embodiments of this invention have been described and illustrated, variations of thermostatically controlled circuits coming within the spirit of this invention will, no doubt, readily suggest themselves to those skilled in the art. For example, the diodes in the load circuits may be omitted in certain cases where the transistors are of the silicon type. The capacitor across the contacts of the thermostat may be omitted if the control current is very small. Also, N-P-N transistors may be employed instead of the P-N-P transistors illustrated if the requisite changes in polarity are made in a manner well understood in the art. Other changes within the spirit of the present invention will undoubtedly also suggest themselves. Hence, it is desired that the foregoing description of the invention shall be considered merely as illustrative and not in a limiting sense.

What is claimed is:

1. A thermostatically controlled network comprising two circuits connected in parallel with each other, one of said two circuits comprising a thermostat and resistive means connected in series therewith, the other of said two circuits comprising a transistor having three electrodes, a load element, and means connecting said load element in series with the path between two of said electrodes, means connecting said resistive means to the remaining one of said electrodes, and means to apply a source of voltage across said two circuits.

2. A thermostatically controlled network as defined in claim 1 wherein said thermostat comprises a make-and-break switching device.

3. A thermostatically controlled network as defined in claim 1 wherein said transistor comprises, as electrodes, an emitter, a base, and a collector, said path comprises the emitter-collector path of said transistor, and said remaining electrode is said base.

4. A thermostatically controlled network as defined in claim 1 wherein said other circuit comprises a forwardly biased diode connected in series with said path and said load element.

5. Apparatus for controlling the amplitude of current to a load in accordance with the temperature of a thermostat, said apparatus comprising a network having two parallel branch circuits, one of said circuits comprising a transistor having a control electrode and a current path adapted to be controlled by said control electrode, and means connecting said load in series with said current path, the other of said circuits comprising a thermostat and resistive means connected in series therewith, means to connect a source of current to said network to cause current to flow in said circuits, and means connecting a point in said other circuit to said control electrode to control the flow of current in said one circuit in accordance with the temperature of said thermostat.

6. Apparatus as defined in claim 5 wherein said one circuit comprises a forwardly biased diode connected in series with said current path and said load, said diode comprising means to bias said transistor into a substantially non-conducting state when the temperature of said thermostat reaches a predetermined temperature.

7. Apparatus for controlling the temperature of an environment by controlling the current to a heating element at said environment, said apparatus comprising a network having two parallel circuits, one of said circuits comprising a transistor having a current path and a control electrode therefor, means connecting said heating element in series with said current path, the other of said circuits comprising a thermostat and resistive means connected in series therewith, means to connect a source of current to said network to cause current to flow in said circuits, said thermostat being exposed to and controlled by the temperature of said environment to vary the operating condition of said thermostat, and means connecting a point in said other circuit to said control electrode to control said current in said one circuit in accordance with the condition of said thermostat.

8. Apparatus as defined in claim 7 wherein said one circuit comprises a forwardly biased diode connected in series with said current path and said heating element, said diode comprising means to bias said transistor to cut-off when said thermostat reaches a predetermined operating condition.

References Cited in the file of this patent

UNITED STATES PATENTS

| | | |
|---|---|---|
| 2,455,387 | Sippel | Dec. 7, 1948 |
| 2,664,489 | Dickey | Dec. 29, 1953 |
| 2,932,714 | Merrill | Apr. 12, 1960 |
| 2,954,479 | Cibelius | Sept. 27, 1960 |